(12) United States Patent
Weber et al.

(10) Patent No.: US 6,602,530 B1
(45) Date of Patent: Aug. 5, 2003

(54) ATMOSPHERIC STEAMER

(75) Inventors: Matthew A. Weber, Dayton, OH (US); Andrew E. Wildman, Urbana, OH (US); Atul Saksena, Troy, OH (US)

(73) Assignee: Premark FEG L.L.C., Wilmington, DE (US)

( * ) Notice: Subject to any disclaimer, the term of this patent is extended or adjusted under 35 U.S.C. 154(b) by 25 days.

(21) Appl. No.: 09/706,476

(22) Filed: Nov. 3, 2000

(51) Int. Cl.[7] .............................................. A47J 27/04
(52) U.S. Cl. ...................... 426/233; 426/510; 426/511; 426/523; 99/330; 99/333; 99/448; 99/468; 99/481; 126/369
(58) Field of Search .......................... 99/330, 333, 403, 99/444, 446, 447, 481, 468; 426/233, 510, 511, 523; 126/369

(56) References Cited

U.S. PATENT DOCUMENTS

| | | |
|---|---|---|
| 5,890 A | 10/1848 | Stevens |
| 76,231 A | 3/1868 | Morandi |
| 102,608 A | 5/1870 | Smith |
| 171,411 A | 12/1875 | Murray |
| 174,194 A | 2/1876 | Chamberlin |
| 183,554 A | 10/1876 | Flanders |
| 221,542 A | 11/1879 | Farrar |
| 225,584 A | 3/1880 | Flanders |
| 3,000,373 A * | 9/1961 | Hawley ..................... 126/59.5 |
| 3,604,895 A | 9/1971 | MacKay |
| 3,992,984 A | 11/1976 | Treiber |
| 4,167,585 A * | 9/1979 | Caridis et al. ............... 426/233 |
| 4,273,991 A | 6/1981 | Barnhill |
| 4,373,430 A | 2/1983 | Allen |
| 4,509,412 A | 4/1985 | Whittenburg et al. |
| 4,510,854 A * | 4/1985 | Robertson .................... 99/337 |
| 4,528,975 A | 7/1985 | Wang |
| 4,582,047 A * | 4/1986 | Williams .................... 126/369 |
| 4,649,898 A | 3/1987 | Martinson |
| 5,161,518 A | 11/1992 | Bedford |
| 5,287,798 A | 2/1994 | Takeda |
| 5,549,038 A | 8/1996 | Kolvites |
| 5,584,235 A | 12/1996 | DuBois et al. |
| 5,631,033 A | 5/1997 | Kolvites |
| 5,653,161 A | 8/1997 | Nopanen et al. |
| 5,662,959 A | 9/1997 | Tippmann |
| 5,865,101 A | 2/1999 | Brown |
| 5,869,812 A | 2/1999 | Creamer et al. |
| 5,968,574 A | 10/1999 | Sann .......................... 426/510 |
| 6,000,392 A | 12/1999 | Stritzl et al. |
| 6,076,452 A | 6/2000 | Dessuise |
| 6,107,605 A | 8/2000 | Creamer et al. |
| 6,143,341 A * | 11/2000 | Sikes .......................... 426/510 |
| 6,175,100 B1 | 1/2001 | Creamer et al. |

FOREIGN PATENT DOCUMENTS

| | | |
|---|---|---|
| DE | 855933 | 11/1952 |
| FR | 1006476 | 4/1952 |
| FR | 1481257 | 5/1967 |
| FR | 2491595 | 4/1982 |
| FR | 2619613 | 2/1989 |

* cited by examiner

*Primary Examiner*—Keith Hendricks
*Assistant Examiner*—Drew Becker
(74) *Attorney, Agent, or Firm*—Thompson Hine LLP

(57) ABSTRACT

An atmospheric steamer includes a steam chamber defined at least in part by a housing, and a water retaining area having at least one associated heating element for heating the water to generate steam. A vent opening is provided through the housing. A steam diverting baffle may be positioned around the vent opening to define a passage which leads to the vent opening. A sensor may be positioned along a vent path from the vent opening for sensing passage of steam along the vent path.

17 Claims, 2 Drawing Sheets

ATMOSPHERIC STEAMER

FIELD OF THE INVENTION

The present invention relates generally to food steamers and, more particularly, to steamers designed for steaming food products at atmospheric pressures.

BACKGROUND OF THE INVENTION

Commonly used steamers utilize pressure controls to turn on/off the heating elements which produce steam. This arrangement results in excessive steam loss, and requires the use of a closed, pressurized system. The closed system can result in flavor transfer form one product to another when products are being steamed simultaneously. For this reason, open system steamers or atmospheric type steamers in which the steam cavity is open to the atmosphere by a vent are also used. One problem experienced in such atmospheric steamers is again excessive steam losses due to the tendency of steam to migrate immediately toward and out of the vent opening. Such steam migration out of the vent opening also results in undesired temperature differences at different points in the steam cavity, as well as undesired temperature fluctuations in the steam cavity. Such undesired temperature differences in various parts of the cavity can also make it difficult to achieve suitable control of steam generation based upon monitoring temperature within the steam cavity.

Accordingly, it would be desirable to provide an improved atmospheric steamer construction which reduces steam losses and provides a more uniform and consistent temperature in the steam cavity.

SUMMARY OF THE INVENTION

In one aspect of the present invention, an atmospheric steamer includes a steam chamber defined at least in part by a housing, and a water retaining area having at least one associated heating element for heating the water to generate steam. A vent opening is provided through the housing. A steam diverting baffle is positioned around the vent opening to define a passage which leads to the vent opening. The baffle defines a passage opening for permitting steam to migrate towards the vent opening along the passage, with the passage opening being positioned to force steam to turn before proceeding toward the vent opening. The passage includes at least one drainage outlet for permitting steam which condenses in the passage to pass back to the water retaining area for further heating. The incorporation of the baffle within the steam chamber reduces steam losses by causing steam to condense inside the steam chamber as it loses energy in turning downward toward the vent.

In another aspect of the invention, an atmospheric steamer includes a steam chamber defined at least in part by a housing, and a water retaining area including at least one associated heating element for heating the water to generate steam which is provided to the steam chamber. A vent opening is provided through the housing. The vent opening leads to a vent path for venting gases from the steam chamber and a sensor is positioned along the vent path for sensing the passage of steam along the vent path. A controller receives an output from the sensor and controls the heating element. The controller is operable during a steaming operation to effect water heating responsively to the output received from the sensor.

In a preferred arrangement, the sensor may be a temperature sensor positioned along the vent path. The controller receives an output from the temperature sensor and controls the heating element such that heating of the water is stopped when a temperature in the vent tube reaches a threshold temperature indicative of steam exiting through the vent tube, and heating of the water is again initiated when the temperature in the vent tube falls below the threshold temperature by a predetermined amount.

DETAILED DESCRIPTION OF THE EMBODIMENTS

Figure 1:
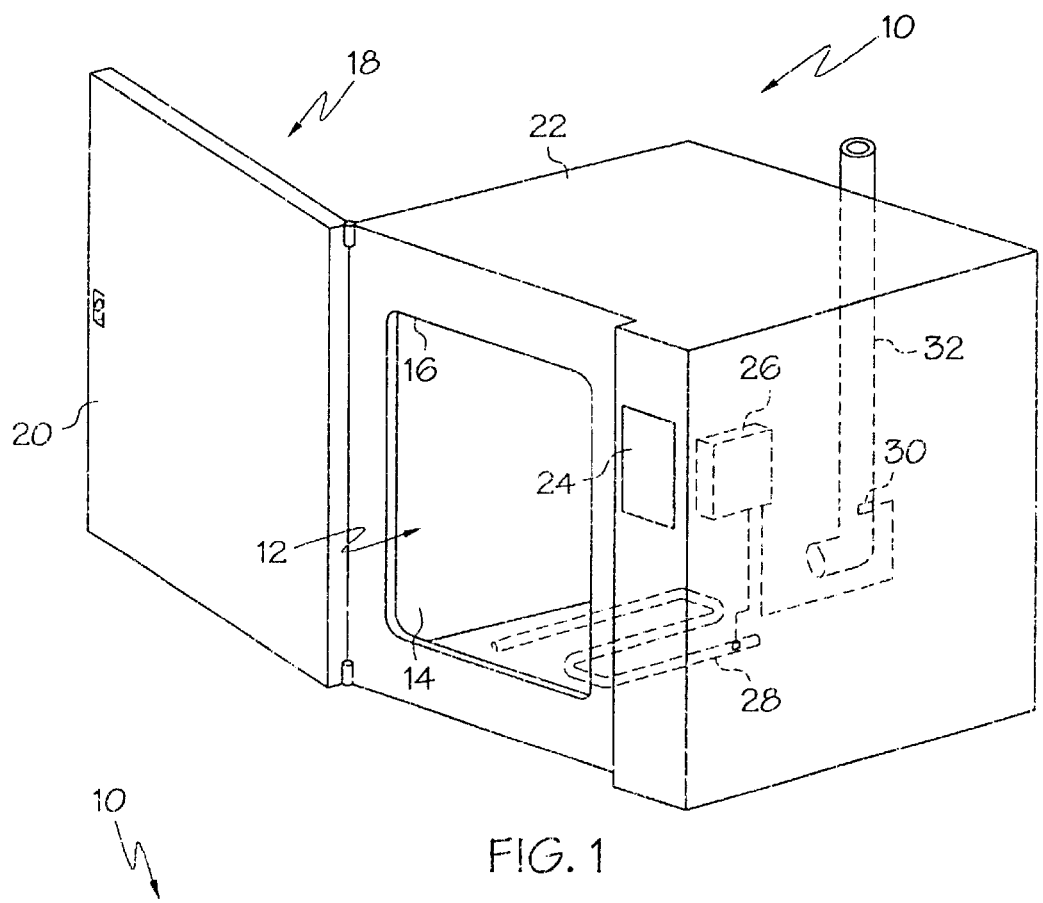
FIG. 1 is a perspective view of an atmospheric steamer.

Referring to drawing FIG. 1, a perspective view of one embodiment of an atmospheric steamer 10 is shown. The steamer 10 includes an interior steam chamber 12 which is defined by interior housing walls 14 and an access opening 16. A pivotable door 18 closes such that its inner surface 20 defines a sixth wall of the steam chamber. The interior housing walls 14 and exterior housing 22 may typically be formed of stainless steel with suitable insulation positioned therebetween. A user input device 24, such as a keypad, touch sensitive screen, or one or more adjustable knobs, is located on a front portion of the steamer to allow an operator to set operating parameters such as steaming duration etc. A controller 26 is also provided and is connected for controlling energization of a heating element 28, such as a resistive heating element which may be located immediately below the bottom surface of the steam chamber 12. The controller 26 is also connected for receiving an output of a sensor 30 which is positioned along a vent path defined by a vent tube 32. In a preferred embodiment, the sensor 30 comprises a temperature sensor.

Figure 2:
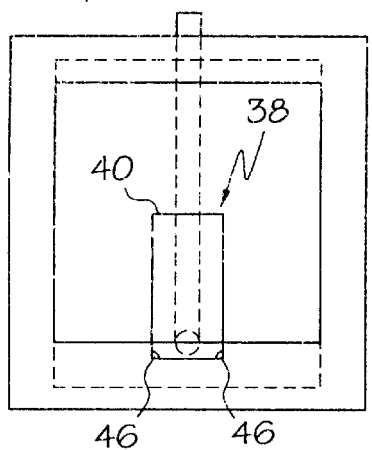
FIG. 2 is a front elevation of the atmospheric steamer of FIG. 1 with the door removed.
Figure 3:
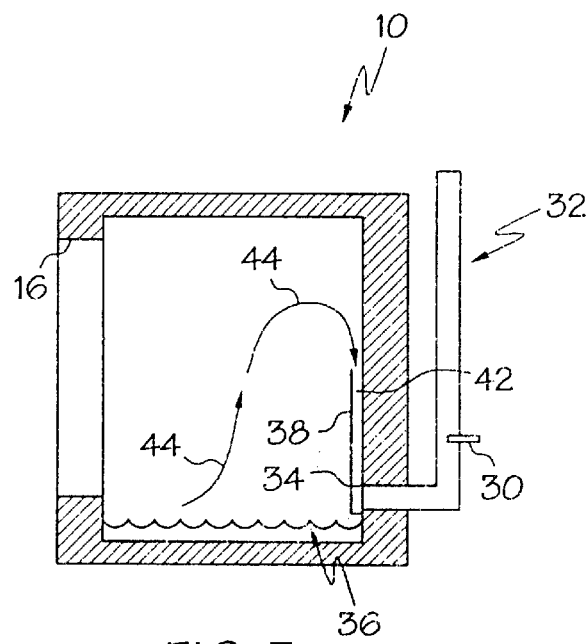
FIG. 3 is a side elevation of the atmospheric steamer of FIG. 1 shown in partial cross-section.

As shown in the front and side elevations of FIGS. 1 and 2, the steamer 10 includes a vent opening 34 to which one end of the vent tube 32 attaches for receiving steam from the steam chamber 12. The bottom portion of the steam chamber acts as a water retaining area 36 where water is heated to generate steam within the chamber 12. The vent opening 34 is positioned above a typical water level of the water retaining area 36. A steam diverting baffle 38 is positioned around the vent opening 34 to define a passage 42. In the illustrated embodiment the vent opening 34 is located toward a lower portion of the baffle 38 and passage 42 as shown, but it is recognized that the vent opening 34 could be positioned at a higher location. The baffle 38 defines a passage opening 40 with a housing wall of the steam chamber 12 for permitting steam to migrate towards the vent opening 34. The remaining portion of the baffle defines the passage 42 with the housing wall of the steam chamber 12, with the passage 42 leading to the vent opening 34.

In the illustrated embodiment, the passage opening 40 is spaced from the water retaining area 36 so as to force steam generated at the water retaining area 36 to move upward from the water retaining area and turn back downward (as shown by arrows 44) before proceeding toward the vent opening 34. This forced downward turning of the steam causes the steam to lose energy, resulting in the production of condensate within the passage 42. Accordingly, the passage 42 includes drainage outlets 46, located at the lower corners of the baffle 38 in the illustrated embodiment, for permitting steam which condenses in the passage 42 to pass back to the water retaining area 36 for further heating. It is also recognized that steam could be forced to turn in a direction other than downwards in order cause the steam to lose energy and condense.

During a steaming operation, the controller 26 controls the heating element 28 to heat the water and produce steam in the steam chamber 12 according to the output received from the sensor 30 located in vent tube 32. In particular, a steaming operation is started and the heating element 28 is energized. As steam is initially produced, a majority of any steam seeking to migrate out of the vent opening 34 loses energy due to the baffle 38, condenses and runs back into the water retaining area 36 for further heating. Once substantially the entire steam chamber 12 becomes filled with steam, steam will begin to pass out the vent opening 34 and through the vent tube 32 towards the sensor 30. When the sensor 30 output indicates a threshold level of steam travel along the vent tube 32, the controller 26 deenergizes the heating element 28 to stop water heating and steam production, in order to avoid excessive steam loss. For example, where a temperature sensor is used, water heating may be stopped when the sensor output indicates a threshold temperature along the vent path which is indicative of substantial steam travel along the vent path. As the temperature within the steam chamber 12 and vent tube 32 begins to cool, the controller 26 responsively reenergizes the heating element 28 when the output of the sensor 30 indicates that the temperature in the vent tube has fallen by a predetermined amount.

In one arrangement the temperature sensor 30 is positioned within about five inches of the vent opening 34 and the threshold temperature is between 196° F. and 204° F., where the predetermined amount is between 2° F. and 5° F. A more preferred arrangement has proven excellent results when the threshold temperature is set at about 200° F. and the predetermined amount is about 3° F.

Figure 4:
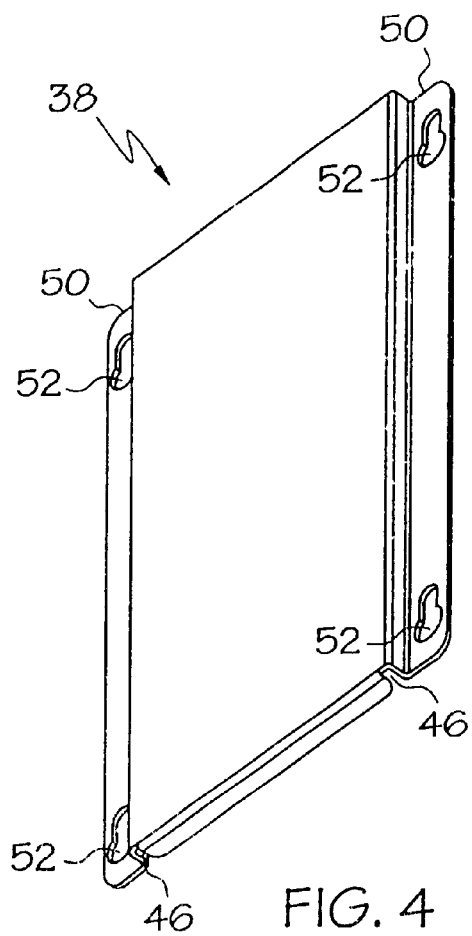
FIG. 4 is a perspective view of an exemplary baffle.

Referring now to FIG. 4, one embodiment of a baffle 38 useful in conjunction with the steamer of the present invention is shown. The baffle 38 is formed of stainless steel and includes mounting flanges 50 having mounting openings 52 formed therein for securing the baffle 38 to a wall of the steam chamber via suitable fasteners. However, it is recognized that other attachment means could be used. Similarly, while the illustrated baffle 38 is particularly suited for positioning against a flat wall of a steam chamber, it is recognized that where the steam chamber wall is curved the baffle could be similarly curved. It is preferred, but not required, that a height of the baffle 38 be at least one third a height of the steam chamber so as to position the passage opening suitably above the water retaining area 36 to cause the desired upward movement of steam followed by a downward turn en route to the vent opening 34. It may be preferred that the flow area of the steam chamber passage be equal to or greater than an area of the vent opening. Similarly, it may be preferred that a width of the baffle 38 be at least one fourth the height to provide a suitable steam passage 42. In a more preferred arrangement a width of the baffle 38 may be at least one half the height, particularly where a spacing between an inner surface of the baffle and the steam chamber wall is no more than about 0.5 inches.

Figure 5:
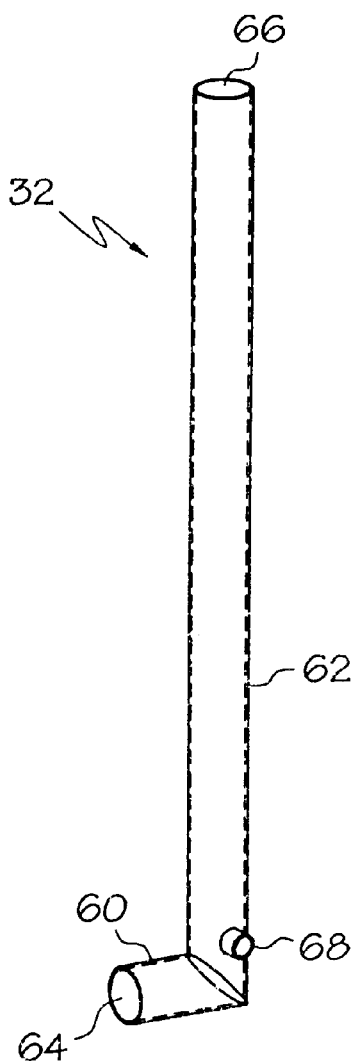
FIG. 5 is a perspective view of an exemplary vent tube.

An exemplary vent tube 32 construction is shown in FIG. 5 and includes section 60 with section 62 extending perpendicularly therefrom. The end 64 connects to the vent opening 34 and end 66 vents to ambient atmosphere. An access port 68 is provided at the lower end of section 62 for inserting the sensor 30. As noted above, it is preferred, but not required, that the sensor 30 be positioned within about five inches of end 64.

The subject steamer construction provides an advantageous method of maintaining a relatively uniform and constant temperature within a steam chamber of an atmospheric steamer which involves the steps of positioning a baffle within the steam chamber about a vent opening of the steam chamber to define a passage for causing steam to turn downward en route to the vent opening. Steam is condensed in the passage, producing condensate. At least one drain outlet is provided along the passage, and condensate is returned to a water heating area of the steamer through the drain outlet. A heating element is provided for heating water to generate steam, and a flow of steam along a vent path which extends from the vent opening is sensed so that water heating by the heating element can be controlled according to the sensed steam flow. In one method a temperature sensor is used to sense steam flow and the controlled water heating involves (i) effecting water heating until the sensed temperature rises to a first threshold temperature indicative of steam exiting along the vent path, (ii) stopping water heating when the sensed temperature reaches the first threshold temperature, and (iii) effecting water heating when the sensed temperature falls to a second threshold temperature which is less than the first threshold temperature. These water heating steps are generally repeated for a set time period corresponding to a known time period necessary to steam a given food product placed in the steam chamber.

A further advantageous method of atmospheric steaming provided by the subject steamer construction involves providing a steam chamber having a vent opening which leads to a vent path and providing a heating element for heating water to generate steam which is delivered to the steam chamber. The passage of steam along the vent path which extends from the vent opening is sensed, and water heating by the heating element is controlled according to the sensed steam passage along the vent path. The controlled water heating may involve (i) effecting water heating until the sensed passage of steam along the vent path rises to a first threshold level, (ii) stopping water heating when the sensed passage of steam reaches the first threshold level, and (iii) effecting water heating when the sensed passage of steam falls to a second threshold level which is less than the first threshold level.

The steamer constructions and methods described above provide improved uniformity of temperature throughout the steam cavity 12 by causing steam to fill substantially the entire cavity before any significant steam loss through the vent opening 34 and vent tube 32 occurs. One result is more uniform cooking of food products located in different parts of the steam cavity during a steaming operation. Further, in the preferred arrangement, because the water heating is controlled according to steam flow along the vent path so that such heating is stopped when steam starts to be vented in a significant amount, steam loss during a steaming operation may be reduced. Still further, cyclic changes in the temperature within the steam cavity 12 during a steaming operation may be reduced.

Although the invention has been described and illustrated in detail it is to be clearly understood that the same is intended by way of illustration and example only and is not intended to be taken by way of limitation. For example, while the most preferred arrangement includes the water retaining area within the steam cavity itself, it is possible that the water retaining area could be separate from the steam cavity with a passage provided from the water retaining area to the steam cavity for introducing steam to the steam cavity. Further, while the described arrangement suggests the use of an electrical type heating element, it is recognized that other types of heating elements, such as gas burners in combination with a heat exchanger, could be used. Still further, while a temperature sensor is described for use in sensing passage of steam along the vent path, other types of sensors could be used to sense or detect the passage of steam.

Accordingly, the spirit and scope of the invention are to be limited only by the terms of the appended claims.

What is claimed is:

1. An atmospheric steamer, comprising:
    a steam chamber defined at least in part by a housing;
    a water retaining area including at least one associated heating element for heating the water to generate steam which is provided to the steam chamber;
    a vent opening through the housing;
    a steam diverting baffle positioned around the vent opening to define a passage which leads to the vent opening, the baffle defining a passage opening for permitting steam to migrate towards the vent opening along the passage, the passage opening positioned to force steam to turn before proceeding toward the vent opening, the passage including at least one drainage outlet for permitting steam which condenses in the passage to pass back to the water retaining area for further heating.

2. The atmospheric steamer of claim 1 wherein the vent opening is positioned toward a lower portion of the passage, the passage opening is defined by an upper portion of the baffle such that steam is forced to turn downward, and the drainage outlet is located toward a lower portion of the passage.

3. The atmospheric steamer of claim 1 wherein the water retaining area is defined by a bottom of the steam chamber, the passage opening being spaced from the water retaining area.

4. The atmospheric steamer of claim 1 wherein a height of the baffle is at least one third a height of the steam chamber and wherein a width of the baffle is at least one fourth a height of the baffle.

5. The atmospheric steamer of claim 4 wherein the width of the baffle is at least one half the height of the baffle.

6. The atmospheric steamer of claim 4 wherein a spacing between the inner surface of the baffle and a cavity wall is no more than 0.5 inches.

7. The atmospheric steamer of claim 1 wherein a flow area of the passage is greater than or equal to an area defined by the vent opening.

8. The atmospheric steamer of claim 1, further comprising:
    a vent tube having a first end associated with the vent opening and a second end for venting gases passing therethrough;
    a sensor positioned along the vent tube for sensing the passage of steam along the vent tube; and
    a controller for receiving an output from the sensor and for controlling the heating element, the controller operable during a steaming operation to effect water heating responsively to the output received from the sensor.

9. The atmospheric steamer of claim 8 wherein the sensor comprises a temperature sensor and water heating is stopped when a temperature in the vent tube reaches a threshold temperature indicative of steam exiting through the vent tube, and wherein water heating is again initiated when the temperature in the vent tube falls below the threshold temperature by a predetermined amount.

10. The atmospheric steamer of claim 9 wherein the threshold temperature is adjustable.

11. The atmospheric steamer of claim 9 wherein the threshold temperature is between 196° F. and 204° F. and wherein the predetermine amount is between 2° F. and 5° F.

12. The atmospheric steamer of claim 9 wherein the threshold temperature is about 200° F. and the predetermined amount is about 3° F.

13. An atmospheric steamer, comprising:
    a steam chamber defined at least in part by a housing;
    a water retaining area including at least one associated heating element for heating the water to generate steam which is provided to the steam chamber;
    a vent opening through the housing which leads to a vent passage for venting gases from the steam chamber;
    a sensor positioned along the vent passage for sensing the passage of steam along the vent passage; and
    a controller for receiving an output from the sensor and for controlling the heating element, the controller operable during a steaming operation to effect water heating responsively to the output received from the sensor; and
    a steam diverting baffle positioned around the vent opening to define a passage which leads to the vent opening, the baffle defining a passage opening for permitting steam to migrate towards the vent opening along the passage, the passage opening positioned to force steam to turn downward before proceeding toward the vent opening, the passage including at least one drainage outlet for permitting steam which condenses in the passage to pass back to the water retaining area for further heating.

14. A method of atmospheric steaming, the method comprising the steps of:
    (a) positioning a baffle within a steam chamber about a vent opening of the steam chamber to define a passage for causing steam to turn downward en route to the vent opening;
    (b) condensing steam in the passage producing condensate;
    (c) providing at least one drain outlet along the passage;
    (d) returning condensate to a water heating area of the steam chamber through the drain outlet.

15. The method of claim 14 comprising the further steps of:
    (e) providing a heating element for heating water to generate steam;
    (f) sensing a passage of steam along a vent path which extends from the vent opening; and
    (g) controlling water heating by the heating element according to the sensed steam passage.

16. The method of claim 15 wherein step (f) involves sensing a temperature along the vent path and step (g) involves (i) effecting water heating until the sensed temperature rises to a first threshold temperature indicative of steam exiting along the vent path, (ii) stopping water heating when the sensed temperature reaches the first threshold temperature, and (iii) effecting water heating when the sensed temperature falls to a second threshold temperature which is less than the first threshold temperature.

17. The method of claim 14 wherein steps (g)(i), (ii) and (iii) are repeated for a set time period.

* * * * *